(12) United States Patent
Ng et al.

(10) Patent No.: US 10,246,805 B2
(45) Date of Patent: Apr. 2, 2019

(54) CONNECTOR ASSEMBLY FOR USE IN FILTER ELEMENTS OF PRESS FILTER AND PRESS FILTER COMPRISING THE SAME

(75) Inventors: Ying Yuk Ng, Hong Kong (CN); Gilbert Craig, Wallingford, CT (US)

(73) Assignee: FAIRTECH INVESTMENT LIMITED, Wanchai (HK)

( * ) Notice: Subject to any disclaimer, the term of this patent is extended or adjusted under 35 U.S.C. 154(b) by 218 days.

(21) Appl. No.: 14/001,997

(22) PCT Filed: Feb. 23, 2012

(86) PCT No.: PCT/CN2012/071506
§ 371 (c)(1),
(2), (4) Date: Nov. 8, 2013

(87) PCT Pub. No.: WO2012/116612
PCT Pub. Date: Sep. 7, 2012

(65) Prior Publication Data
US 2014/0326651 A1    Nov. 6, 2014

(30) Foreign Application Priority Data

Feb. 28, 2011    (WO) ................ PCT/CN2011/071371
Dec. 21, 2011    (WO) ................ PCT/CN2011/084323

(51) Int. Cl.
*B01D 25/12*    (2006.01)
*B01D 29/03*    (2006.01)
(Continued)

(52) U.S. Cl.
CPC .............. *D04H 1/08* (2013.01); *B01D 25/12* (2013.01); *B01D 25/176* (2013.01); *B01D 29/03* (2013.01);
(Continued)

(58) Field of Classification Search
CPC ...... B01D 25/12; B01D 25/122; B01D 25/14; B01D 25/176; B01D 2265/028;
(Continued)

(56) References Cited

U.S. PATENT DOCUMENTS 3,250,063 A    5/1966    Andrews
4,925,560 A    5/1990    Sorrick
(Continued)

FOREIGN PATENT DOCUMENTS

CN    2062250 U    9/1990
CN    1176841 A    3/1998
(Continued)

OTHER PUBLICATIONS

Yutaka Tokiwa et al., "Biodegradability of Plastics", International Journal of Molecular Sciences, 2009, 21 pages.
(Continued)

*Primary Examiner* — Patrick J Orme
(74) *Attorney, Agent, or Firm* — M. J. Ram and Associates

(57) ABSTRACT

The invention provides a connector assembly for fastening filter elements onto a supporting plate of a press filter, comprising a first cylindrical core, a first flange extending outward from the first cylindrical core, a second cylindrical core, and a second flange extending outward from the second cylindrical core. The first cylindrical core is shaped and dimensioned such that it snugly passes through and is meshed with a central through hole of the supporting plate, and the second cylindrical core is shaped and dimensioned such that it snugly passes through and is meshed with the first cylindrical core. Both the first cylindrical core and the first flange and both the second cylindrical core and the second flange are respectively molded integrally from a non-woven fabric which has the ability of self-sustaining (Continued)

and shape maintenance, and is moldable. The invention also relates to a press filter fitted with the connector assembly.

16 Claims, 11 Drawing Sheets

(51) Int. Cl.

| | | |
|---|---|---|
| *B01D 25/176* | (2006.01) | |
| *D04H 1/08* | (2012.01) | |
| *B01D 35/30* | (2006.01) | |
| *D04H 1/4291* | (2012.01) | |
| *D04H 1/485* | (2012.01) | |
| *D04H 1/558* | (2012.01) | |
| *D04H 1/49* | (2012.01) | |
| *D04H 1/54* | (2012.01) | |
| *G10K 11/162* | (2006.01) | |

(52) U.S. Cl.
CPC ......... *B01D 35/306* (2013.01); *D04H 1/4291* (2013.01); *D04H 1/485* (2013.01); *D04H 1/49* (2013.01); *D04H 1/54* (2013.01); *D04H 1/558* (2013.01); *G10K 11/162* (2013.01); *Y10T 442/50* (2015.04); *Y10T 442/56* (2015.04)

(58) Field of Classification Search
CPC ........ B01D 2275/205; B01D 2239/064; B01D 2239/0636; B01D 2239/0654; B01D 2239/0659; B01D 2239/0668; B01D 35/306; B32B 5/26; D04H 1/485; D04H 1/558; D04H 1/593
See application file for complete search history.

(56) References Cited

U.S. PATENT DOCUMENTS

| | | | | |
|---|---|---|---|---|
| 4,931,178 A | * | 6/1990 | Manniso et al. | 210/228 |
| 5,275,097 A | * | 1/1994 | Wettlaufer | 100/113 |
| 5,419,953 A | * | 5/1995 | Chapman | B01D 39/083 428/109 |
| 6,007,717 A | * | 12/1999 | Hayhurst | B01D 25/176 210/230 |
| 2008/0050565 A1 | * | 2/2008 | Gross | B32B 5/22 428/212 |

FOREIGN PATENT DOCUMENTS

| | | |
|---|---|---|
| CN | 2503966 Y | 8/2002 |
| CN | 1125710 C | 10/2003 |
| WO | WO-2010063079 A1 | 6/2010 |

OTHER PUBLICATIONS

Fox et al., "Short Fiber Composite Materials", 11 pages.
Knowlton, James L., "Short Fiber Study Update", USDA, AMS, Cotton Program, 9 pages.
M. Deam Ethridge et al., "Textile Topics", vol. 2004-3, Summer 2003, International Tech Center Texas Tech University, "Renewed Focus on Short Fibers", 8 pages.
"Continuous Fiber Composite Strength" (multiple references cited therein), 7 pages.
Automated Dynamics, "Short Fiber Reinforcement", 2 pages.
Mathur et al., "The Short Scoop on Long Fiber Thermoplastics (LFT)", Plasticomp, 28 pages.
Tiwari, Nachiketa, "Mechanics of Laminated Composite Structures", Indian Institute of Technology Kanpur, 13 pages.
Thibodeaux et al., "Textile Technology, A comparison of methods for measuring the short fiber content of cotton", The Journal of Cotton Science, 12:298-305 (2008), 7 pages.
Kardos, J.L., "Critical Issues in achieving desirable mechanical properties for short fiber composites," Pure & Appl. Chem, vol. 67, No. 11, pp. 1661-1667, 1985, 8 pages.
Garoushi et al., "Short fiber reinforced composite: the effect of fiber length and volume fraction", J Contemp Dent Pract, Nov. 1, 2006, 7(5):10-7, 2 pages.
A. C. Long "Design and Manufacture of Textile Composites", the Textile Institute, 3 pages.

* cited by examiner

CONNECTOR ASSEMBLY FOR USE IN FILTER ELEMENTS OF PRESS FILTER AND PRESS FILTER COMPRISING THE SAME

FIELD OF THE INVENTION

The present invention relates to the technical field of press filter, more particularly, to a connector assembly for fastening filter elements onto a supporting plate of a press filter and various types of press filter comprising the connector assembly, said connector assembly is molded from a non-woven fabric which is stiff enough to be self-sustaining, has the ability of shape maintenance, and is moldable.

BACKGROUND OF THE INVENTION

A press filter is well-known to find a wide range of applications in chemistry, petroleum, mining, foods and pharmaceutical industries for separation of solids from liquids. Generally, the press filter comprises a plurality of filter plates arranged in parallel from one another for the separation of solids from liquids, a frame on which the plurality of filter plates are supported, a pressure mechanism for pressing the plurality of filter plates together during the filtration cycle, and a cake discharge mechanism. Each of the filter plates comprises a supporting plate which is recessed on both sides and filter elements such as filter cloth covered on both sides of the supporting plate. Once pressed together, the plurality of filter plates form a series of chambers.

Generally, the supporting plates have a central through hole that passes through the entire length of the press filter so that all the chambers of the filter plates are connected together, and the slurry or the suspension is fed through the central through hole into the chambers. The filtrates permeates the filter cloth and flow downward along the wall of the supporting plate.

Four corner ports are provided on each supporting plate to connect all the plates, wherein the top two corner ports are to introduce washing liquid or compressed air, and the bottom two corner ports are to collect the filtrates that permeate the filter cloth towards outlets and then are drained away. The cakes are formed on the face of the filter cloth and fill the chambers. The cakes are compressed and dewatered during the filtration cycle and the cake thickness increases over time. Once the optimum combination of chamber filling and cake dryness is achieved, the filtration is stopped, the pressure is relieved and the cakes are discharged by the cake discharge mechanism. A new filtration cycle starts.

Presently, the basic design to install the filter cloth on both sides of the supporting plate is to sew the filter cloth into a sack into which the supporting plate is inserted, or to stretch out two pieces of filter cloth over two sides of the supporting plate. The filter cloth has a hole positioned to correspond to the central through hole of the supporting plate, and the two pieces of the filter cloth are pressed against each other by a connecting means which is either sewn or bonded to the edges of the cloth holes and then is mounted on the central through hole of the supporting plate. To install the filter cloth on the supporting plate, it is necessary to align the central through hole of the supporting plate and the cloth hole, and the connecting means is connected with the filter cloth and with the central through hole of the supporting plate in a leak-proof manner. If the central through hole and the cloth hole are not aligned, the operation of the press filter would be less effective, and the leakage may occur and result in low filtration rate. Further, it is often that damage to the filter cloth may take place when the connecting means connects the filter cloth and the filter cloth is mounted on the central through hole of the supporting plate, which makes the cloth unusable. As can be seen, the current methods of installing the filter cloth on the supporting plate are very labor intensive with a high risk of leakage and damage to the cloth.

Various efforts have been made in order to solve the problems associated with filter cloth installation and filter cloth leakage. For example, US patent application no. 2010/0200518A1 provides a filter element for a press filter, comprising first and second filtering means, first and second connecting means and a securing ring. Each of the first and second connecting means comprises a flange portion and a tubular portion, wherein the flange portion of the first connecting means is fixedly attached to the first filtering means and the flange portion of the second connecting means is fixedly attached to the second filtering means, and wherein the tubular portion of the first connecting means is insertable into the tubular portion of the second connecting means. The securing ring is insertable into the tubular portion of the first connecting means and is adapted to exert a radial force on the tubular portion of the first connecting means, pressing the tubular portion of the first connecting means against the tubular portion of the second connecting means, thereby to realize the purpose of robustness and leak resistance. It is to be noted that the securing ring is needed for pressing the first filtering means against the second filtering means, which results in complicated replacement of the filter cloths. Moreover, when the securing ring is damaged or when the securing ring is installed in a manner that the first and second connecting means cannot be locked in place by the securing ring, the leakage phenomenon would take place.

Non-woven fabric is a cloth that is neither woven nor knitted. The non-woven fabric exhibits good filterability, permeability and absorption, and therefore is suitable to be used as a filter medium.

The international application under PCT/CN2011/071371 filed by the applicant on 28 Feb. 2011 discloses a e non-woven fabric, a method for producing the fabric, and a filter formed with the fabric. The non-woven fabric is made of at least one low-melting-point short fiber and at least one high-melting-point short fiber, and characterized in that the low-melting-point fiber is a solidifiable material, particularly is capable of solidifying after it is heated to melt, whereby the obtained felt fabric has the ability of self-sustaining and shape maintenance. The felt fabric disclosed in this patent application can also be molded into various shapes according to the actual needs and has a characteristic of being-persistently retaining in those shapes after it is molded. Therefore, the fabric exhibits excellent hardness and stiffness, remarkable moldability, and high compressive strength, in addition to the conventional properties of good filterability, permeability and absorption.

Another international application under PCT/CN2011/084323 filed by the applicant on 21 Dec. 2011 discloses a novel non-woven fabric, a method for producing the fabric, and a filter formed with the fabric. This non-woven fabric is made of one short fiber of the same type, or two or more types of short fiber which have a substantially same melting point, and characterized in that about 30% to 80% of the short fiber is heated to melt and then solidifies so as to form a single melting point non-woven fabric. It was tested that the single melting point non-woven fabric obtained as such is also stiff to have the ability of self-sustaining and shape maintenance, and exhibits excellent hardness and stiffness, remarkable moldability, and high compressive strength, in addition to the conventional properties of good filterability, permeability and absorption.

In light of the unique characteristics of the non-woven fabric discussed above, especially self-sustaining and shape maintenance, remarkable moldability and excellent filterability, the non-woven fabric may be molded into various elements used in the different types of filters. The molded elements not only make it possible that the labor intensity of installing and assembling the elements is greatly reduced, but also that the connection of the various molded elements from one another is more intimate and robust.

SUMMARY OF THE INVENTION

It is an object of the present invention to provide a connector assembly for fastening filter elements onto a supporting plate of a press filter at low cost, which permits an easy assembly and mounting without causing damage to the filter cloth and also avoids the leakage of the filter cloth.

Another object of the present invention is to provide a filter element comprising the above connector assembly for the press filter, said filter element and said connector assembly being molded as one piece, which eliminates the process of feeding, connecting and stretching out the filter cloth and also eliminates the need for caulking the edge of the cloth, sewing up the cord and hammering it into the groove of the supporting plate, thereby greatly reducing the labor intensity and costs for mounting and changing the filter cloth. The problems associated with the leakage and damage to the cloth are completely prevented because the filter element and the connector assembly are molded integrally.

To attain the aforesaid objects, the invention provides a connector assembly for fastening filter elements onto a supporting plate of a press filter, comprising a first cylindrical core;

a first flange extending outward circumferentially and vertically from one end of the first cylindrical core, the first flange being in firm connection with the respective filter element thereof;

a second cylindrical core; and a second flange extending outward circumferentially and vertically from one end of the second cylindrical core, the second flange being in firm connection with the respective filter element thereof;

wherein the first cylindrical core is shaped and dimensioned such that this cylindrical core snugly passes through and is meshed with a central through hole of the supporting plate, and the second cylindrical core is shaped and dimensioned such that this cylindrical core snugly passes through and is meshed with the first cylindrical core; and wherein both the first cylindrical core and the first flange and both the second cylindrical core and the second flange are respectively molded as one piece from a non-woven fabric which has the ability of self-sustaining and shape maintenance, and is moldable.

In one preferred embodiment of the invention, the non-woven fabric comprises at least two layers of short fiber and a water barrier arranged therebetween, the water barrier is made of a moldable material (for example moldable plastic material) such that the at least two layers of short fiber and the water barrier are molded as one piece.

Advantageously, the non-woven fabric is the type of non-woven felt fabric. For example the non-woven fabrics disclosed in the international applications under PCT/CN2011/071371 and PCT/CN2011/084323 may be used in the invention. The contents of each of the above-mentioned patent applications are hereby incorporated by reference herein in their entirety and made as a part of this specification. The non-woven felt fabrics taught by these two co-pending applications have excellent hardness and stiffness, remarkable moldability, and high compressive strength, as well as good filterability, permeability and absorption, therefore are suitable for the invention.

The first and second flanges of the connector assembly are in firm connection with the respective filter elements by adhesive or stitching, or the connector assembly is formed integrally with the filter elements.

A second aspect of the invention relates to a caulked, gasketed, and recessed (CGR) type press filter, comprising a plurality of filter plates, each of the filter plates comprising a first filter element, a second filter element that is opposite to the first filter element, and a supporting plate that has a central through hole and a respective recessed area on both sides thereof, said supporting plate being sandwiched between the first and second filter elements;

wherein each of the first and second filter elements comprises a body, a cylindrical core formed at a center of the body, and a flange formed on a perimeter edge of the body; the cylindrical core and the flange protrude outwardly from a same side of the body; and the body, the cylindrical core and the flange are molded integrally from a non-woven fabric which has the ability of self-sustaining and shape maintenance, and is moldable;

the cylindrical core of the first filter element is shaped and dimensioned such that this cylindrical core snugly passes through and is meshed with the central through hole of the supporting plate, and the cylindrical core of the second filter element is shaped and dimensioned such that this cylindrical core snugly passes through and is meshed with the cylindrical core of the first filter element; and the flanges of the first and second filter elements are shaped and sized such that they are snugly received in respective circumferential grooves formed on both sides of the supporting plate.

The third aspect of the invention relates to a recessed type press filter, comprising a plurality of filter plates, each of the filter plates comprising a first filter element, a second filter element that is opposite to the first filter element, and a supporting plate that has a central through hole and a respective recessed area on both sides thereof, said supporting plate being sandwiched between the first and second filter elements; wherein each of the first and second filter elements is molded integrally from a non-woven fabric which has the ability of self-sustaining and shape maintenance, and is moldable.

In one particularly preferred embodiment of the recessed press filter, each of the first and second filter elements comprises a body, a recessed portion formed on the body and corresponding to the respective recessed area of the supporting plate, and a cylindrical core formed on the body; the recessed portion is shaped and dimensioned to cooperate with the recessed area of the supporting plate such that the first and second filter elements are intimately attached to the both sides of the supporting plate respectively; and the body and the cylindrical core are molded integrally from the non-woven fabric; and wherein the cylindrical core of the first filter element is shaped and dimensioned such that this cylindrical core snugly passes through and is meshed with the central through hole of the supporting plate, and the cylindrical core of the second filter element is shaped and dimensioned such that this cylindrical core snugly passes through and is meshed with the cylindrical core of the first filter element.

In one specific embodiment of the recessed press filter, each of the first and second filter elements comprises four side flanges extending laterally from a circumferential edge of the filter element, wherein the cylindrical core and the four side flanges protrude outwardly from the same side of the body; and the four side flanges of each of the first and second filter elements are sized such that the first and second elements are put together to completely and exactly enclose the supporting plate; and the body, the cylindrical core and the four side flanges are molded integrally from the non-woven fabric.

In another specific invention of the recessed press filter, each of the first and second filter elements comprises three side flanges extending laterally from three side edges of the filter element, wherein the cylindrical core and the three side flanges protrude outwardly from the same side of the body; and the three side flanges of each of the first and second filter elements are sized such that the first and second elements are put together to exactly enclose the supporting plate on top, left and right side surfaces thereof, with an open bottom side surface of the supporting plate; and the body, the cylindrical core and the three side flanges are molded integrally from the non-woven fabric.

According to the invention, the supporting plate may comprise two arms cantilevered from two opposite side surfaces of the supporting plate, and the side flanges of the first and second filter elements are formed with two respective notches positioned to correspond to the two cantilevered arms to allow the arms to protrude beyond the first and second filter elements.

As an alternative, PTFE (polytetrafluoroethylene) membranes or acrylic coatings can be applied to the surface of the felt fabric used in the invention, in order to increase the smoothness of the fabric. This is also beneficial to brush off and clean the dust attached to the filter element.

To have a better understanding of the invention reference is made to the following detailed description of the invention and embodiments thereof in conjunction with the accompanying drawings.

BRIEF DESCRIPTION OF THE DRAWINGS

In the various figures of the drawings, like reference numbers are used to designate like parts.

DETAILED DESCRIPTION OF THE INVENTION

It is surprisingly found by the inventor that the non-woven felt fabric, which is made using a single melting point short fiber as a raw material or using at least two short fibers with different melting points as raw materials and subject to the specific procedures (see the disclosure of the international applications under PCT/CN2011/071371 and PCT/CN2011/084323), is capable of self-sustaining and requires no supporting structure to stand alone because it has high hardness and stiffness. The non-woven felt fabric further exhibits remarkable moldability and dimension stability, therefore the felt fabric can be molded into various shapes and has a characteristic of persistently retaining in those shapes after it is molded. Moreover, the non-woven felt fabric has a high compressive strength and thus can withstand repeated pulsing of the cleaning air or fluids and the impact from the cleaning air or fluids.

The invention is based on the above finding to provide a filter element and connector assembly thereof, which require simplified installation, assembly and maintenance. The filter element and the connector assembly are both molded as one piece from the non-woven fabric (for example those felt fabrics disclosed in the above two co-pending applications) which is stiff enough to be self-sustaining, has the ability of shape maintenance, and is moldable. The filter element and the connector assembly formed as such eliminates the need for the labor intensive operation of mounting the filter cloth, and effectively prevents the leakage phenomenon induced by misalignment of the central through hole and the cloth hole. In addition, damage to the filter cloth when the cloth is mounted onto the supporting plate is avoided.

Figure 1:
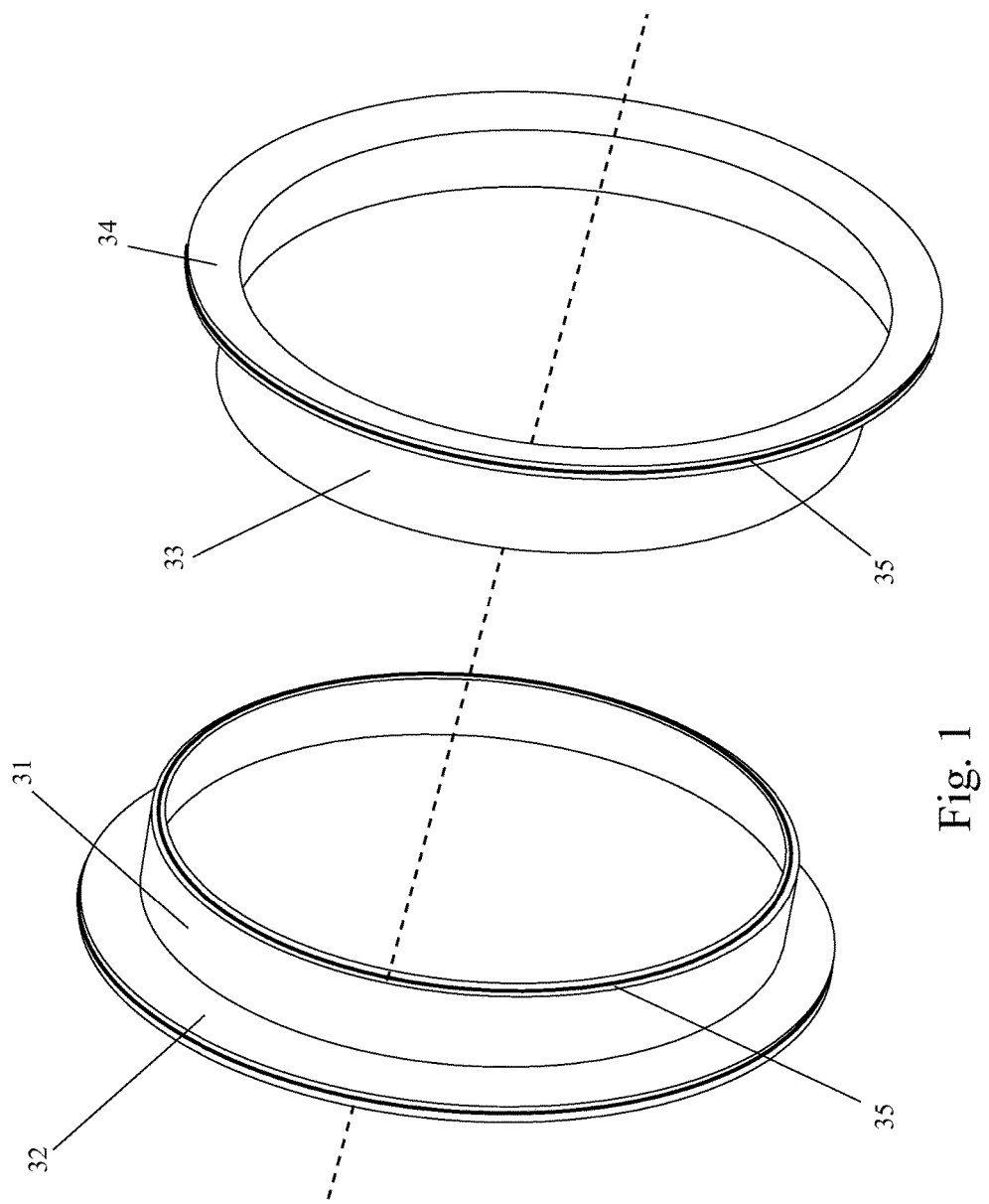
FIG. 1 is a perspective exploded view of a connector assembly constructed according to an embodiment of the invention.

Referring now to FIGS. 1 to 4, there is illustrated a connector assembly 30 constructed according to a specific embodiment of the invention, the connector assembly 30 is adapted for fastening a filter element such as filter cloth onto a supporting plate of a press filter. As illustrated in FIG. 1, the connector assembly 30 comprises a first hollow cylindrical core 31 and a first flange 32 extending outward circumferentially and vertically from one end of the first cylindrical core 31. The connector assembly 30 further comprises a second hollow cylindrical core 33 and a second flange 34 extending outward circumferentially and vertically from one end of the second cylindrical core 33. The first cylindrical core 31 and the first flange 32 are molded as one piece from the non-woven fabric which is stiff enough to be self-sustaining, has the ability of shape maintenance, and is moldable wherein said non-woven needle-punch fabric has a gram weight ranging from 250 g/m$^2$ to 3000 g/m$^2$ The second cylindrical core 33 and the second flange 34 are molded as one piece from the same non-woven fabric.

Figure 2:
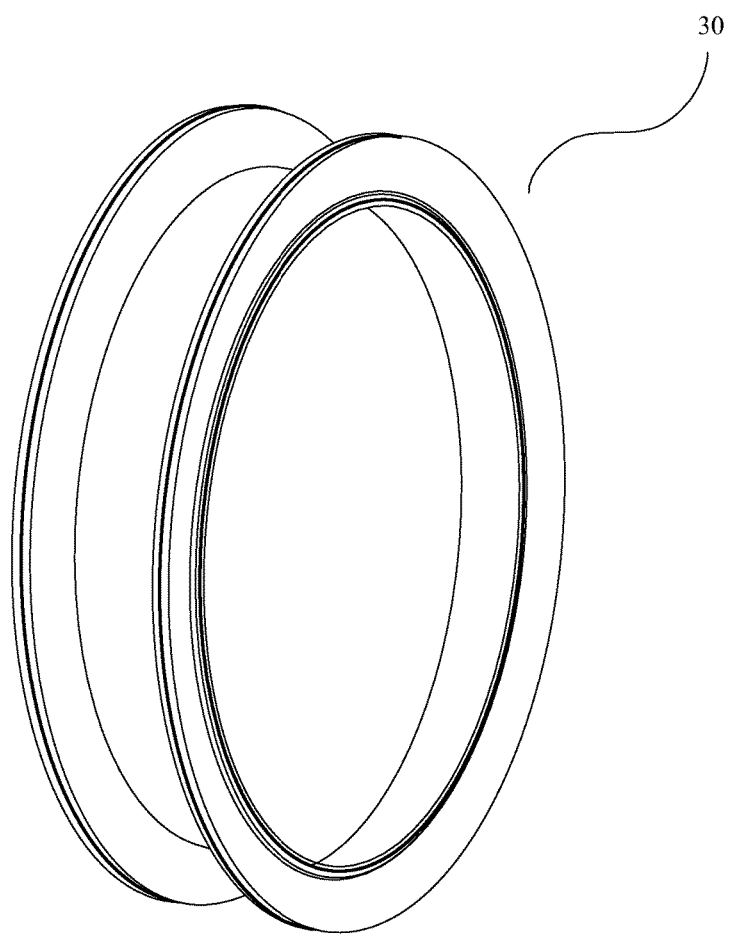
FIG. 2 is a perspective view of the connector assembly shown in FIG. 1 in its assembled state.
Figure 3:
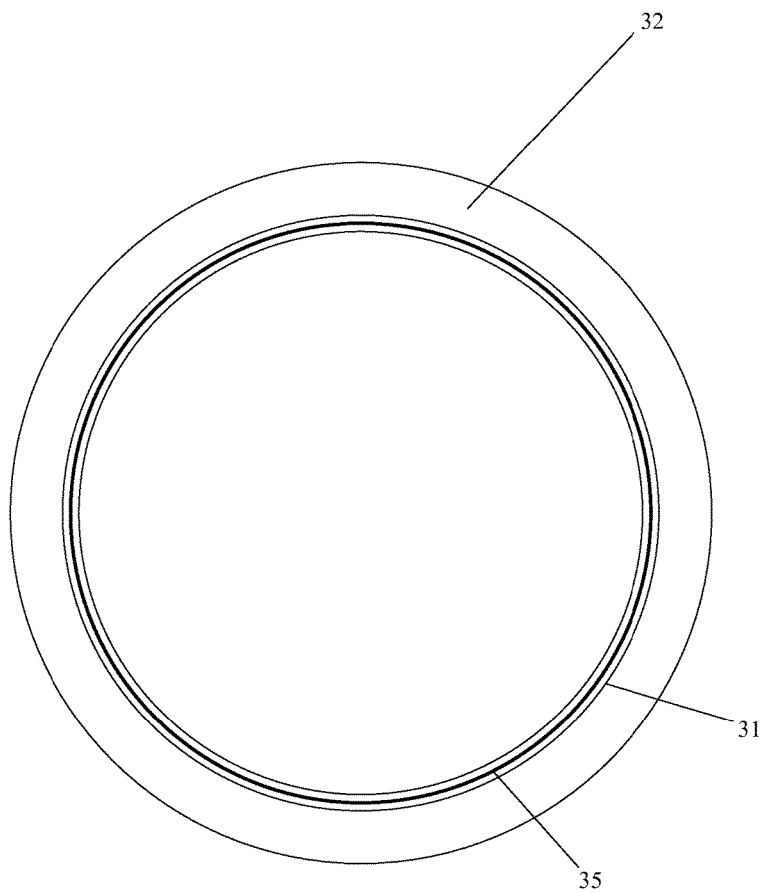
FIG. 3 is a front elevation view of a first cylindrical core and a first flange of the connector assembly shown in FIG. 1.

The first cylindrical core 31 is shaped and dimensioned such that this core snugly passes through and is meshed with the central through hole of the supporting plate (not shown) of the press filter; and the second cylindrical core 33 is shaped and dimensioned such that this cylindrical core snugly passes through and is meshed with the first cylindrical core 31. In particular, the first hollow cylindrical core 31 has a diameter slightly smaller than a diameter of the central through hole of the supporting plate, such that the first cylindrical core 31 snugly passes through and is intimately engaged with the central through hole of the supporting plate; and the second hollow cylindrical core 33 has a diameter smaller slightly than the diameter of the first cylindrical core 31, such that the second cylindrical core 33 snugly passes through and is intimately engaged with the first cylindrical core 31. The connector assembly in assembled state is shown in FIG. 2.

Figure 4:
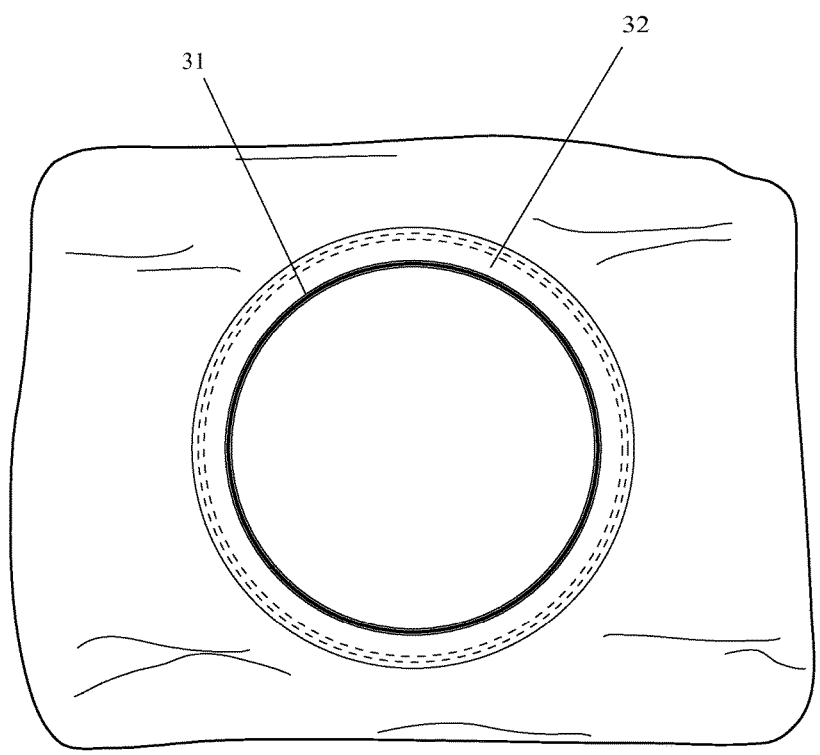
FIG. 4 is a schematic view showing the first flange of FIG. 3 is firmly connected with the filter cloth.

When the filter element (i.e. filter cloth) is not moldable, the first flange 32 and the second flange 34 may be coupled to the filter element by adhesive or stitching or any method known in the art, as shown in FIG. 4. If the filter elements is moldable, then the first flange 32 or the second flange 34 may be molded integrally with the respective filter element.

In order to provide the water proof property to the connector assembly 30 of the invention, the connector assembly is made from a plurality of layers of short fibers. A water proof material 35 like water proof plastic is disposed between two layers of the short fibers during the manufacture of the non-woven fabric. Therefore, the connector assembly molded from the non-woven fabric comprising the water proof material would exhibit definitely the good water proof property.

As discussed above, the non-woven felt fabric exhibits excellent rigidity and hardness as well as remarkable moldability, the connector assembly 30 molded from the felt fabric can stably retain its shape. To assemble the connector assembly 30, it is only required to pass the first cylindrical core 31 from one side of the supporting plate through the central through hole, and then pass the second cylindrical core 33 from the other side of the supporting plate through the central through hole and the first cylindrical core 31 in a manner that the second cylindrical core 33 is meshing inside the first cylindrical core 31 to form a barrel neck. In order to increase the anti-leakage of the connector assembly 30, silicon rubber may be applied to the edges of the connector assembly 30 for the purpose of preventing any potential gap.

As can be seen, the use of the connector assembly of the invention simplifies the mounting and changing of the filter cloth for the press filter, which not only eliminates the need for pressing the edge of the cloth hole against the through hole of the supporting plate, but also prevents the cloth damage and the cloth leakage. Therefore, the labor intensity and costs for implementing, assembling and changing the filter element is greatly reduced.

Figure 5:
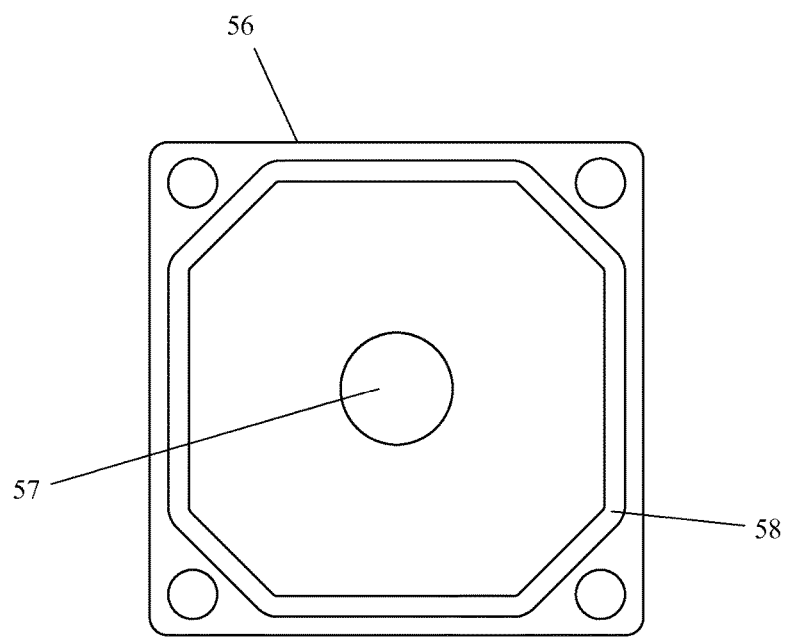
FIG. 5 is a front elevation view of a supporting plate for the CGR press filter used in the invention.
Figure 6:
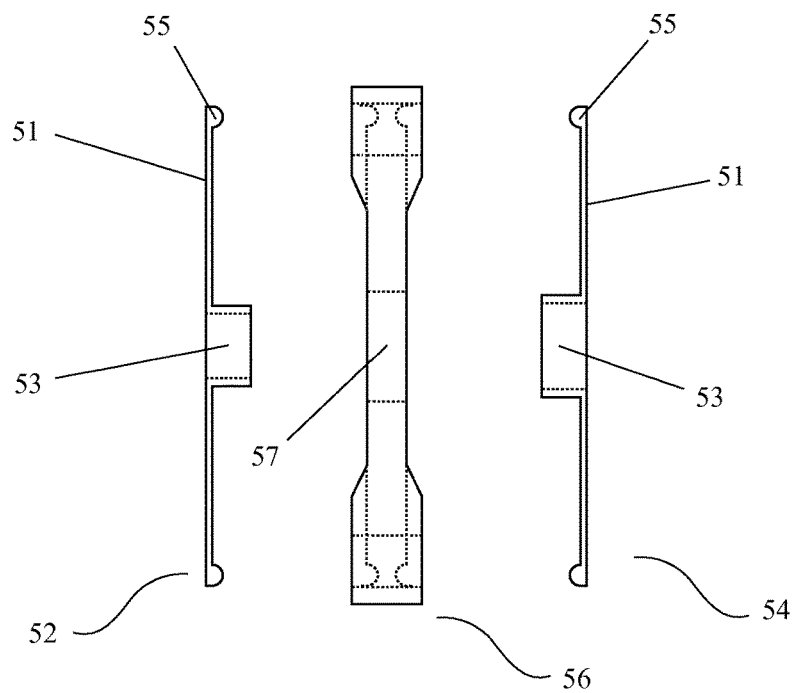
FIG. 6 is a schematic diagram showing that the filter elements made from the non-woven fabric and the supporting plate shown in FIG. 5 are ready to be assembled into the CGR plate filter.
Figure 7:
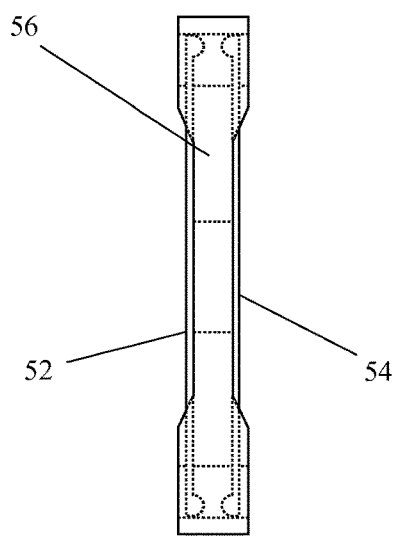
FIG. 7 is a side view of the CGR press filter after the assembly shown in FIG. 6 is completed.
Figure 9:
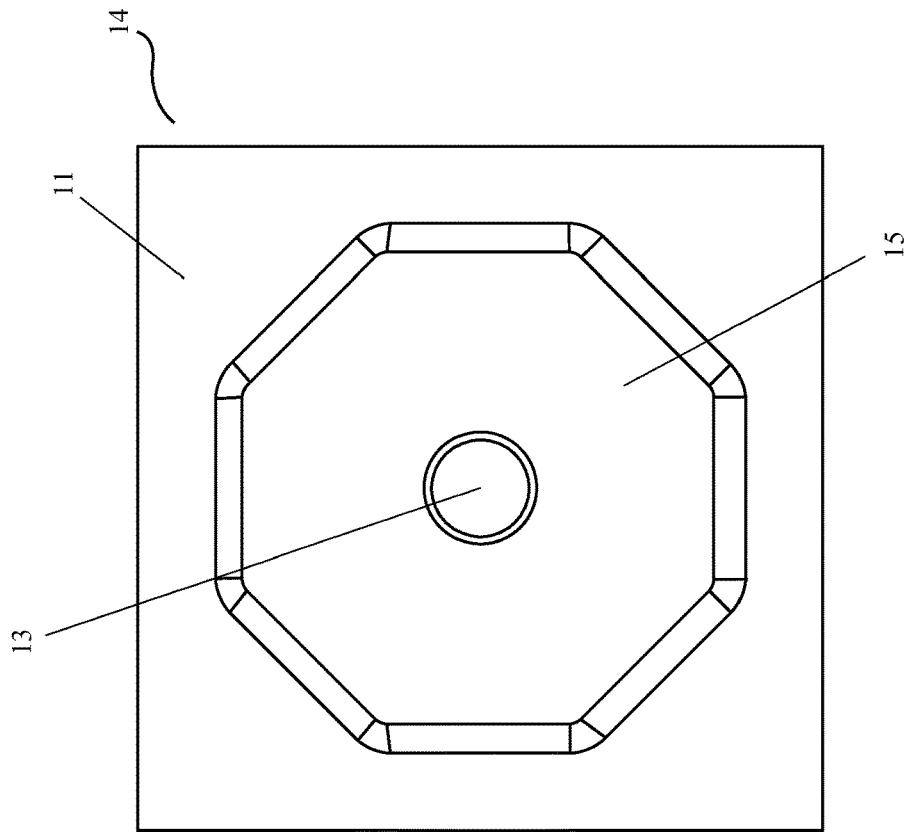
FIG. 9 is a front elevation view of an inner surface of the first filter element for the recessed press filter according to an embodiment of the invention.
Figure 8:
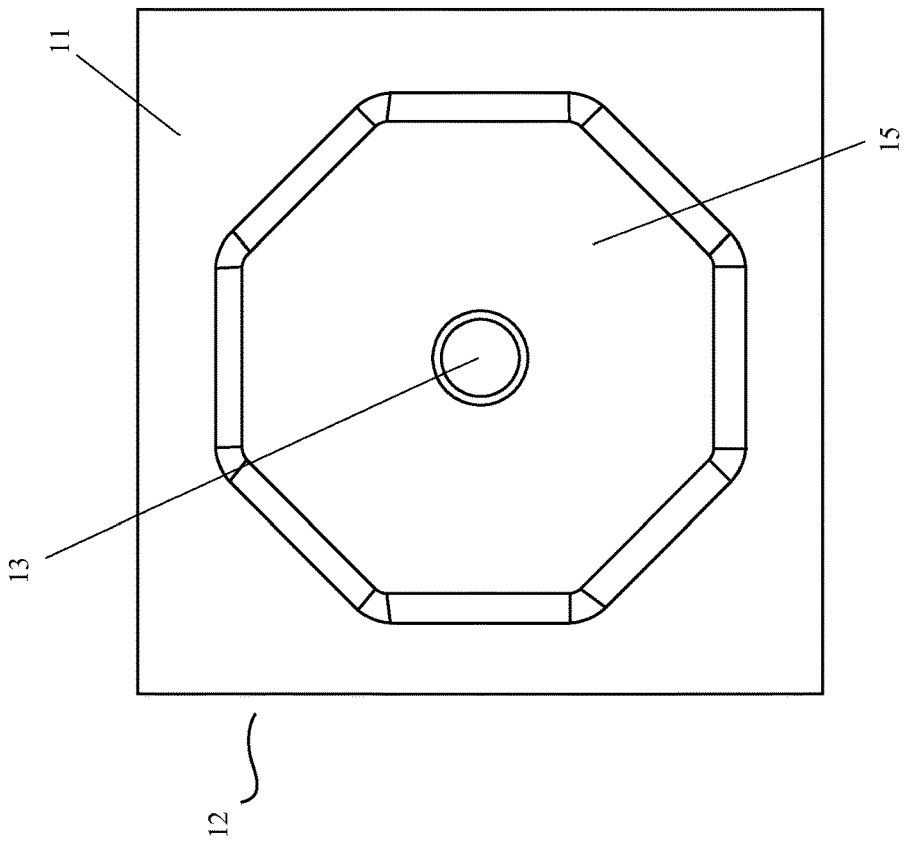
FIG. 8 is a front elevation view of an outer surface of the first filter element for the recessed press filter according to an embodiment of the invention.
Figure 10:
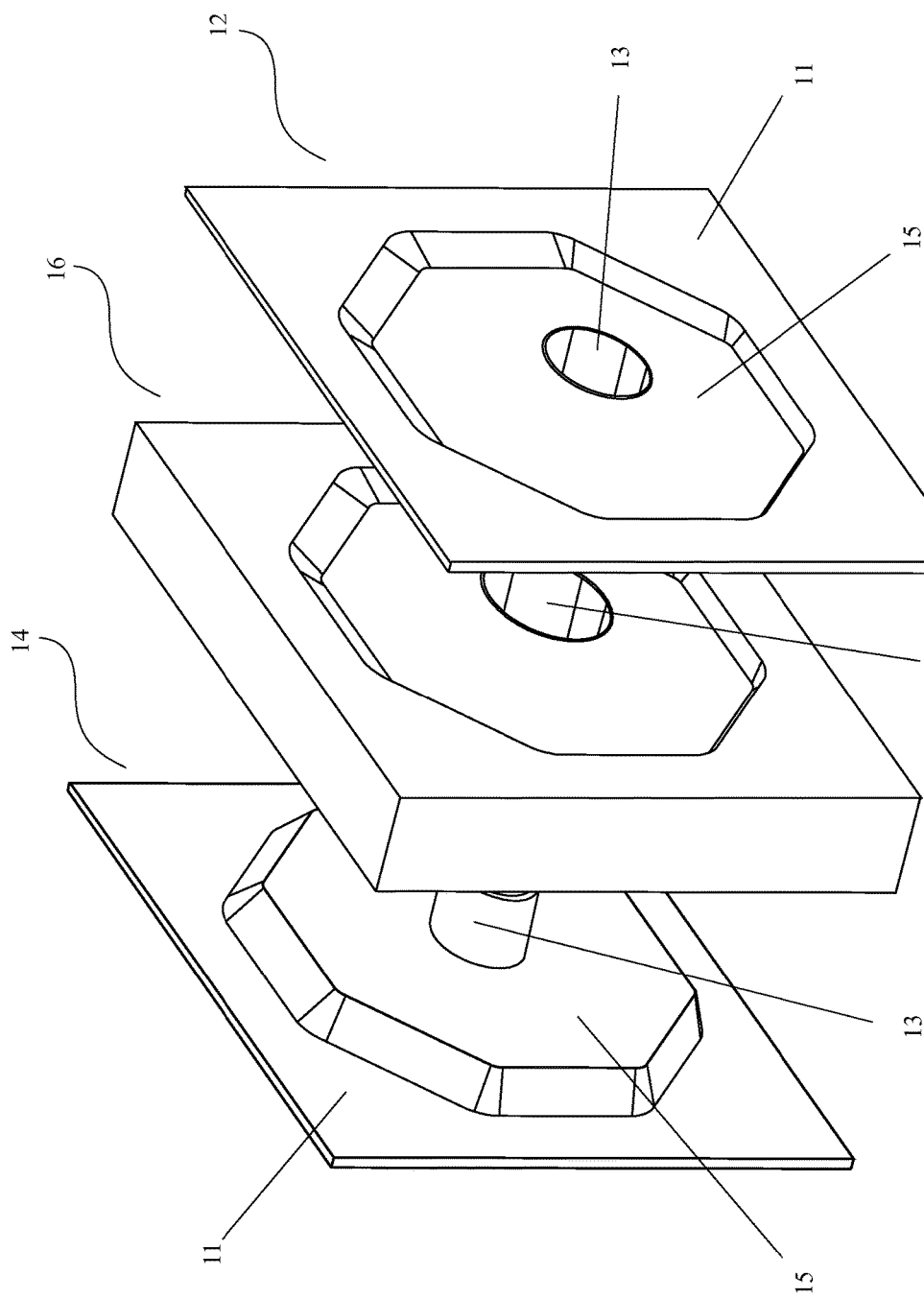
FIG. 10 is a schematic diagram showing that the filter elements shown in FIGS. 8 and 9 and a prior art recessed supporting plate are ready to be assembled into the recess plate filter.
Figure 11:
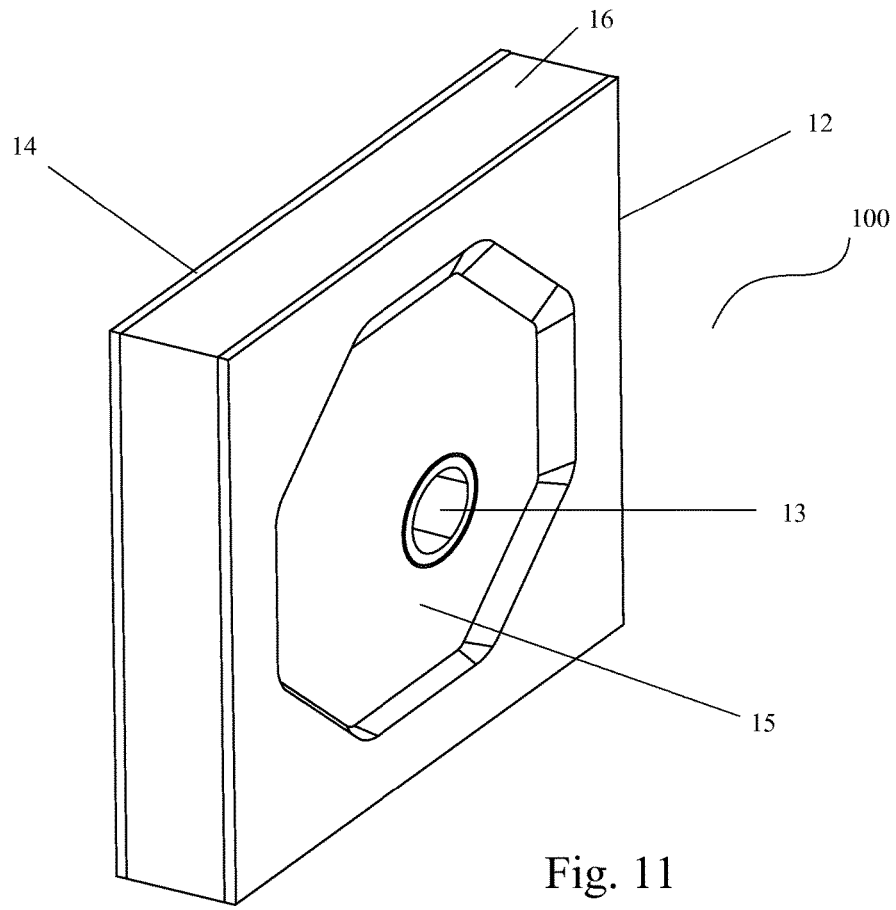
FIG. 11 is a perspective view of the recessed press filter after the assembly shown in FIG. 10 is completed.

FIGS. 5 to 7 illustrate a filter plate for the CGR type press filter according to the invention. The filter plate comprises a first filter element 52, a second filter element 54 that is opposite to the first filter element 52, and a supporting plate 56 that has a central through hole 57 and a respective recessed area on both sides thereof, said supporting plate being sandwiched between the first and second filter elements 52, 54. The first and second filter elements 52, 54 are molded from the non-woven fabric which is stiff enough to be self-sustaining, has the ability of shape maintenance, and is moldable. The supporting plate 56 may be of the conventional type known in the art. Each of the first and second filter elements 52, 54 comprises a body 51, an extended hollow cylindrical core 53 formed at the center portion of the body, and a flange 55 formed on a perimeter edge of the body. The extended cylindrical core 53 and the flange 55 protrude outwardly from a same side of the body. However, the extended hollow cylindrical core of the second filter element 54 has a diameter slightly smaller than a diameter of the extended hollow cylindrical core of the first filter element 52, such that the cylindrical core of the second filter element 54 snugly passes through and is meshed with the cylindrical core of the first filter element 52. The recessed areas of two adjacent supporting plates 56 define a chamber after the supporting plates 56 are pressed together. In this embodiment, the filter element body 51, the cylindrical core 53 and the semicircular flange 55 are molded as one piece from the felt fabric which is stiff enough to be self-sustaining, has the ability of shape maintenance, and is moldable.

The cylindrical core of the first filter element 52 is shaped and dimensioned such that this cylindrical core snugly passes through and is intimately meshed with the central through hole 57 of the supporting plate 56. The cylindrical core of the second filter element 54 is shaped and dimensioned such that this cylindrical core snugly passes through and is intimately meshed with the cylindrical core of the first filter element 52. The semicircular flanges 55 of the first and second filter elements 52, 54 are shaped and sized such that they are snugly received in and fixed within a circumferential groove 58 formed on each side of the supporting plate 56, respectively.

Because the felt fabric used exhibits excellent rigidity, hardness, remarkable moldability and dimension stability, the first filter element 52, the second filter 54 and the supporting plate 56 molded from the felt fabric can stably retain their respective shapes. To assemble the filter plate of the CGR press filter, it is only required to pass the cylindrical core 53 of the first filter element 52 from one side of the supporting plate 56 through the central through hole 57, and snap the semicircular flange 55 into and receive in the circumferential groove 58 of the supporting plate 56. Then, the cylindrical core 53 of the second filter element 54 is allowed to pass from the other side of the supporting plate 56 through the central through hole 57 and the cylindrical core of the first filter element 52 in a manner that the cylindrical core of the second filter element 54 is meshing inside the cylindrical core of the first filter element 52 to form a barrel neck. Likewise, the semicircular flange 55 of the second filter element 54 is snapped into and received in the circumferential groove 58 on the other side of the supporting plate 56. The whole assembly process may be made with reference to FIGS. 6 and 7.

In order to increase the anti-leakage of the cylindrical cores of the first and second filter elements 52 and 54 after they are meshed with each other, silicon rubber may be applied to the edges of cylindrical cores for the purpose of preventing any potential gap.

Obviously, the filter plate of the CGR press filter according to the invention does not require the caulking process, the process of feeding and stretching out the filter cloth, all of which are necessary in the prior art. Therefore, the labor intensity and costs for implementing, assembling and changing the filter is greatly reduced. Moreover, the first filter element and the second filter element are independent from each other, so either of the two elements can be changed or handled individually.

FIGS. 8 to 11 illustrate a filter plate 100 for a recessed type press filter constructed according to the invention. The filter plate 100 comprises a first filter element 12, a second filter element 14 that is opposite to the first filter element 12, and a supporting plate 16 that has a central through hole 17 and a respective recessed area on both sides thereof, said supporting plate being sandwiched between the first and second filter elements 12, 14. The first and second filter elements 12, 14 each is molded from the non-woven fabric which is stiff enough to be self-sustaining, has the ability of shape maintenance, and is moldable. The supporting plate 16 may be of the conventional type known in the art. Each of the first and second filter elements 12, 14 comprises a generally plate-shaped body 11, a recessed portion 15 formed on the body 11 and corresponding to the recessed area of the supporting plate 16, and an extended hollow cylindrical core 13 formed at the center portion of the body 11. The extended cylindrical core 13 protrudes outwardly in the recessed direction of the recessed area of the supporting plate. The recessed areas of two adjacent supporting plates 56 define a chamber after the supporting plates 56 are pressed together. According to the invention, the extended hollow cylindrical core of the second filter element 14 has a diameter slightly smaller than a diameter of the extended hollow cylindrical core of the first filter element 12, such that the cylindrical core of the second filter element 14 snugly passes through and is intimately meshed with the cylindrical core of the first filter element 12. In this embodiment, the filter element body 11 and the cylindrical core 13 are molded as one piece from the same felt fabric which is stiff enough to be self-sustaining, has the ability of shape maintenance, and is moldable.

The cylindrical core of the first filter element 12 is shaped and dimensioned such that this cylindrical core snugly passes through and is intimately meshed with the central through hole 17 of the supporting plate 16. The cylindrical core of the second filter element 14 is shaped and dimensioned such that this cylindrical core snugly passes through and is intimately meshed with the cylindrical core of the first filter element 12.

Like the CGR press filter, in order to increase the anti-leakage of the cylindrical cores of the first and second filter elements 12 and 14 after they are meshed with each other, silicon rubber may be applied to the edges of cylindrical cores for the purpose of preventing any potential gap.

Because the felt fabric used exhibits excellent rigidity, hardness, remarkable moldability and dimension stability, the first filter element 12, the second filter 14 and the supporting plate 16 molded from the felt fabric can stably retain their respective shapes. To assemble the filter plate of the recessed type press filter, it is only required to pass the cylindrical core 13 of the first filter element 12 from one side of the supporting plate 16 through the central through hole 17. Then, the cylindrical core 13 of the second filter element 14 is allowed to pass from the other side of the supporting plate 16 through the central through hole 17 and the cylindrical core of the first filter element 12 in a manner that the cylindrical core of the second filter element 14 is meshing inside the cylindrical core of the first filter element 512 to form a barrel neck. Finally, the first filter element, the supporting plate 16 and the second filter element 14 are pressed together to form the filter plate used for the recessed press filter. The whole assembly process may be made reference to FIGS. 10 and 11.

Again, the filter plate of the recessed press filter according to the invention does not require the process of sewing a filter sack and cutting out the cloth holes, the process of feeding and stretching out the filter cloth over the supporting plate, and the process of alignment of the cloth holes and the through hole of the supporting plate, all of which are necessary in the prior art. Therefore, the labor intensity and costs for implementing, assembling and changing the filter is greatly reduced. The leakage and damage to the cloth is avoided too. Moreover, the first filter element and the second filter element are independent from each other, so either of the two elements can be changed or handled individually.

Figure 12:
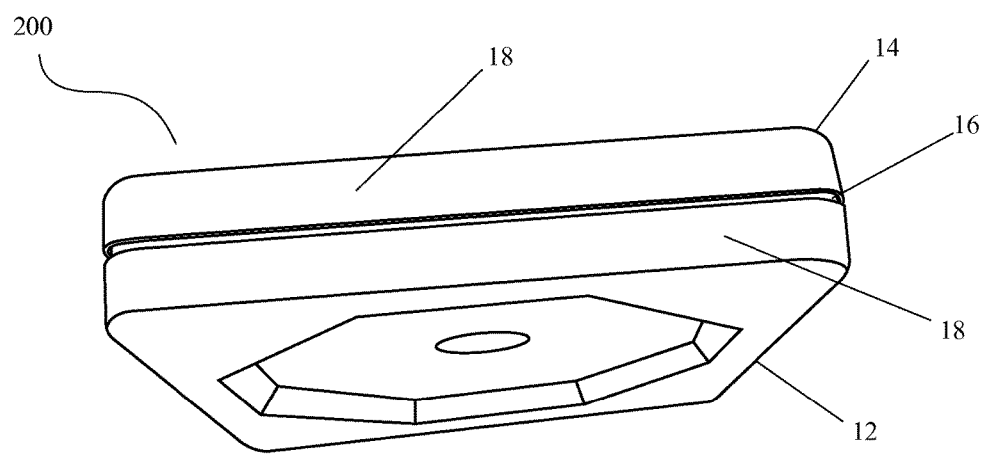
FIG. 12 is a perspective view of a variation of filter elements for the recessed press filter constructed according to the invention.
Figure 13:
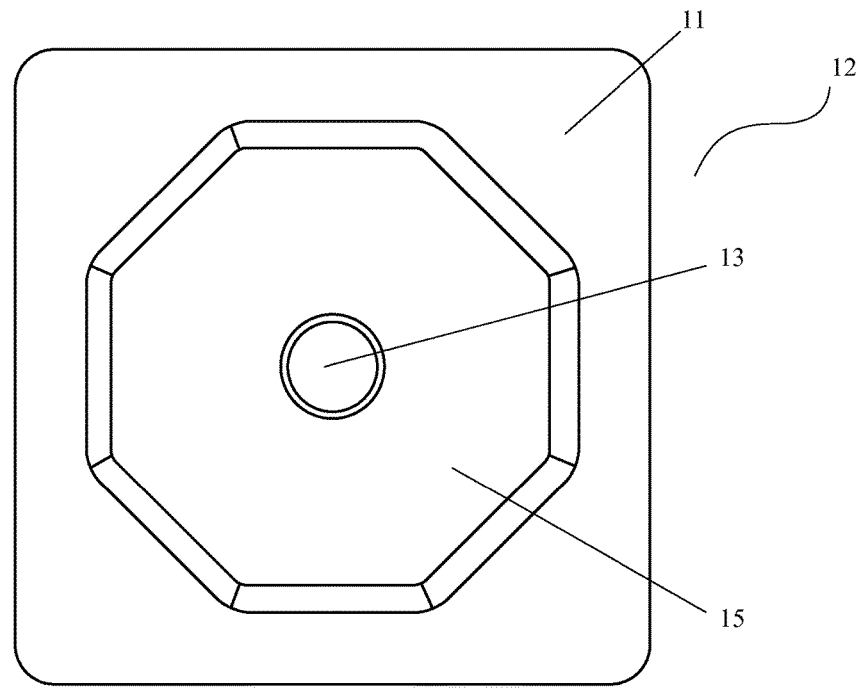
FIG. 13 is a front elevation view of an outer surface of the first filter element shown in FIG. 12.
Figure 14:
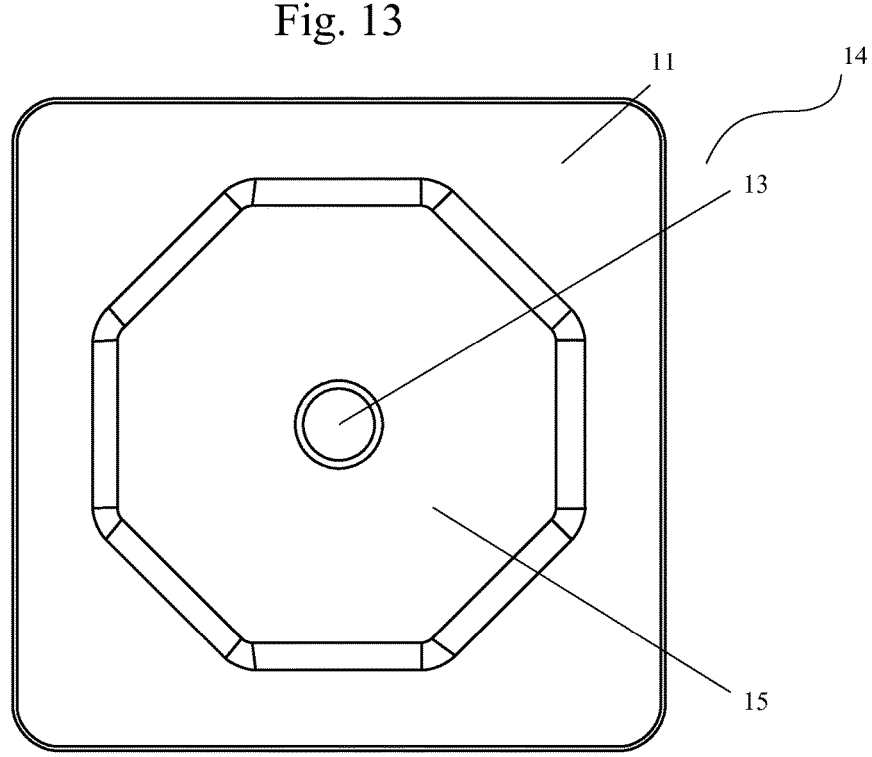
FIG. 14 is a front elevation view of an inner surface of the first filter element shown in FIG. 12.

There is illustrated in FIGS. 12 to 14 a variation of the filter plate for the recessed type press filter constructed according to the invention, wherein FIGS. 13 and 14 respectively illustrate the front and back sides of the first and second filter element for better and clear understanding of the invention.

The filter plate 200 shown in FIGS. 12 to 14 is structurally the same as the filter plate 100 shown in FIGS. 8 to 11, but differs in that each of the first and second filter elements 12, 14 in this embodiment comprises four side flanges 18 extending laterally from the circumferential edge of the filter element, wherein the cylindrical core 13 and the four side flanges 18 protrude outwardly in the recessed direction of the recessed area of the supporting plate. The supporting plate 16 is completely and exactly enclosed by the four side flanges 18. The body 11, the cylindrical core 13 and the four side flanges 18 are molded integrally from the non-woven fabric which is stiff enough to be self-sustaining, has the ability of shape maintenance, and is moldable. As an alternative, each of the first and second filter elements 12, 14 comprises three side flanges 18 extending laterally from three side edges of the filter element, such that top, left and right side surfaces of the supporting plate 16 are enclosed by the three side flanges 18, with the bottom side surface thereof being open to the ambient to allow the filtrate to flow out of the bottom of the filter plate.

Figure 15:
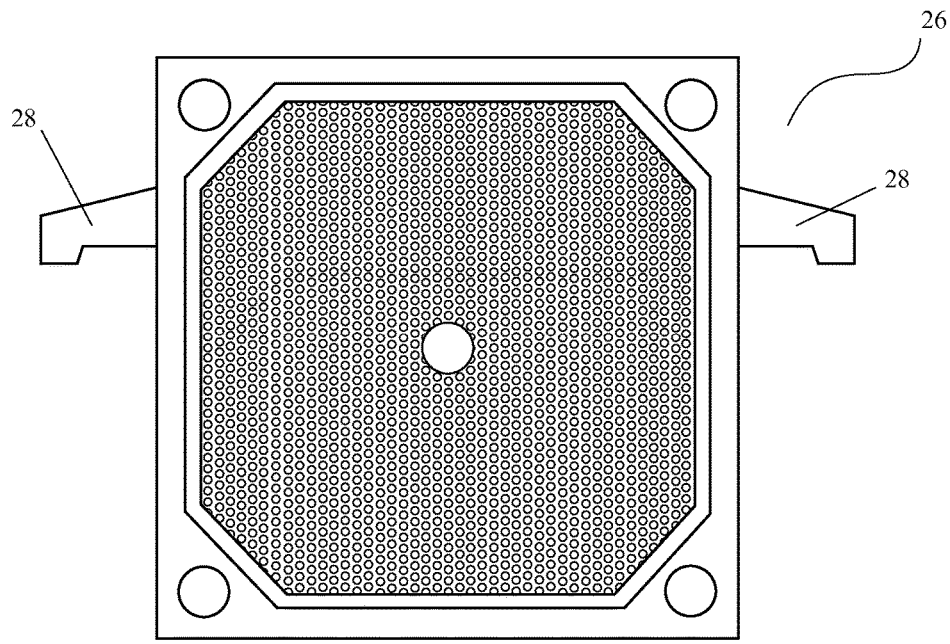
FIG. 15 is a front elevation view of a supporting plate employed in the prior art recessed type press filter.
Figure 16:
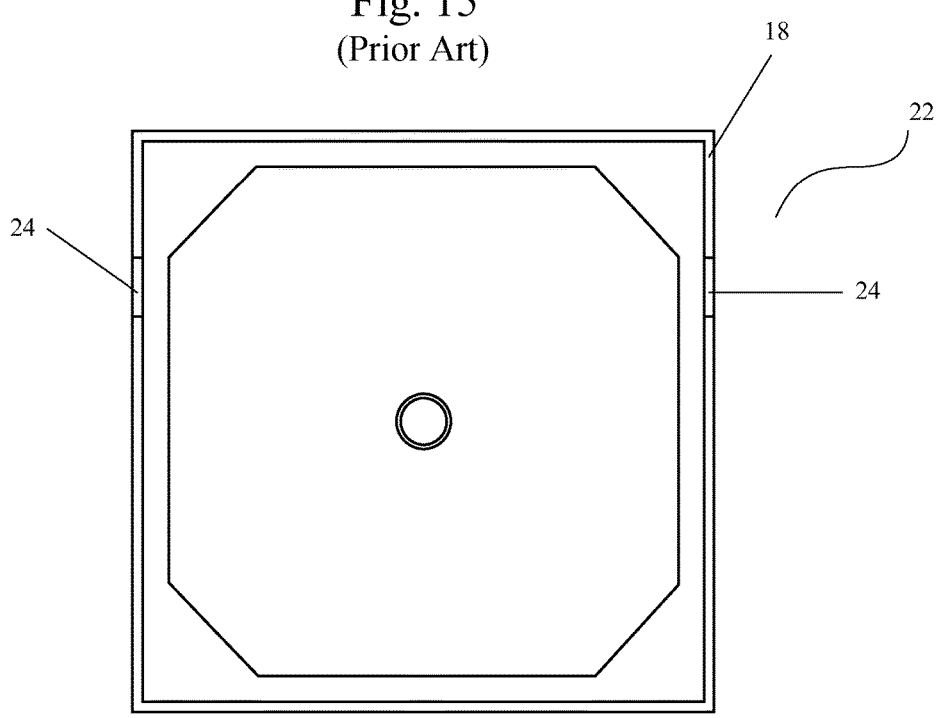
FIG. 16 is a front elevation view of an inner surface of the filter element constructed according to the invention, which is adapted for the supporting plate shown in FIG. 15.

FIG. 15 illustrates a conventional supporting plate for use in the recessed press filter in the art. FIG. 16 provides an inner surface of the filter element constructed according to the invention, which is adapted for the supporting plate shown in FIG. 15. The filter element as illustrated is molded from the felt fabric which is stiff enough to be self-sustaining, has the ability of shape maintenance, and is moldable. The supporting plate 26 in FIG. 15 comprises two arms 28 cantilevered from two opposite side surfaces of the supporting plate 26. The arms 28 may serve to provide a means for mounting or lifting up the filter plate. As shown in FIG. 16, the side flanges 18 of the filter element 22 are formed with respective notches 24 positioned to correspond to the two cantilevered arms 28 to allow the arms 28 to protrude beyond the first and second filter elements.

By making use of the advantages of the non-woven fabric including light weight, high rigidity and hardness, moldability and shape maintenance, the connector assembly and the filter elements for use in the filters, which are molded from such a fabric, permit to retain their shapes while providing sufficient compressive strength. In the meantime, mounting and changing the filter elements would be less labor-intensive and save operation costs.

While the embodiments described herein are intended as exemplary connector assembly and exemplary press filter machines, it will be appreciated by those skilled in the art that the present invention is not limited to the embodiments illustrated. Numerous variations and modifications are easily obtainable by means of the skilled person's common knowledge without departing from the scope of the invention, however, such variations and modifications should fall into the scope of this invention.

What is claimed is:

1. A connector assembly for fastening filter elements onto a supporting plate of a press filter, the connector assembly comprising:
   a first cylindrical core;
   a first flange extending outward circumferentially and vertically from one end of the first cylindrical core, the first flange being in connection with a respective filter element;
   a second cylindrical core; and
   a second flange extending outward circumferentially and vertically from one end of the second cylindrical core, the second flange being in connection with the respective filter element;
   wherein the first cylindrical core is shaped and dimensioned such that the first cylindrical core passes through and is meshed with a central through hole of the supporting plate, and the second cylindrical core is shaped and dimensioned such that the second cylindrical core passes through and is meshed with the first cylindrical core, and wherein the first cylindrical core has a diameter smaller than a diameter of the central through hole of the supporting plate; and
   wherein both the first cylindrical core and the first flange and both the second cylindrical core and the second flange are respectively molded as one piece from a stand-alone non-woven needle-punch fabric having a gram weight ranging from 250 g/m$^2$ to 3000 g/m$^2$, which is self-sustaining and has shape maintenance, and is moldable, said non-woven needle-punch fabric is configured to be molded into a desired shape, and persistently retaining said desired shape under an external pressure after the non-woven needle-punch fabric is molded, such that the connector assembly molded from the non-woven needle-punch fabric maintains its shape without any support;
   wherein said stand-alone non-woven needle-punch fabric is made of at least first and second fibers, the melting point of said first fiber being less than that of said second fiber, wherein the first fiber is rendered to become molten, wherein the nonwoven fabric consists of a single layer of fiber formed by evenly blending the first fiber and the second fiber, wherein said first fiber has a melting point ranging from 115° C. to 130° C., and said second fiber has a melting point ranging from 180° C. to 230° C.

2. The connector assembly as claimed in claim 1, wherein the non-woven needle-punch fabric comprises at least two layers of fiber and a water barrier arranged therebetween, the water barrier being a moldable material such that the at least two layers of fiber and the water barrier are molded as one integral piece.

3. The connector assembly as claimed in claim 2, wherein the water barrier is made of a plastic material.

4. The connector assembly as claimed in claim 2, wherein the first and second flanges of the connector assembly are in connection with the respective filter elements by adhesive or stitching, or the connector assembly is formed integrally with the filter elements.

5. The connector assembly as claimed in claim 1, wherein the non-woven needle-punch fabric is a non-woven needle-punch felt fabric.

6. The connector assembly as claimed in claim 1, wherein the first and second flanges of the connector assembly are in connection with the respective filter elements by adhesive or stitching, or the connector assembly is formed integrally with the filter elements.

7. The connector assembly as claimed in claim 1, wherein said first fiber is a solidifiable material which is capable of solidifying after being heated to melt.

8. A caulked, gasketed, and recessed (CGR) type press filter, comprising:
   a plurality of filter plates; each of the plurality of filter plates comprising a first filter element, a second filter element that is opposite to the first filter element, and a supporting plate that has a central through hole and a respective recessed area on both sides thereof, said supporting plate being sandwiched between the first and second filter elements;
   wherein each of the first and second filter elements comprises a body, a cylindrical core formed at a center portion of the body, and a flange formed on a perimeter edge of the body; the cylindrical core and the flange protrude outwardly from a same side of the body; and the body, the cylindrical core and the flange are molded integrally from a non-woven needle-punch fabric to form a unitary structure, said non-woven needle-punch fabric having a gram weight ranging from 250 g/m$^2$ to 3000 g/m$^2$ which is self-sustaining and has shape maintenance, and is moldable, said non-woven needle-punch fabric is able to be molded into a desired shape, and is capable of persistently retaining said desired shape under an external pressure after the fabric is molded, such that each of the first and second filter elements molded from the non-woven needle-punch fabric maintains its shape without any support;
   wherein said stand-alone non-woven needle-punch fabric is made of at least first and second fibers, the melting point of said first fiber being less than that of said second fiber, wherein the first fiber is rendered to become molten, wherein the nonwoven fabric consists of a single layer of fiber formed by evenly blending the first fiber and the second fiber, wherein said first fiber has a melting point ranging from 115° C. to 130° C., and said second fiber has a melting point ranging from 180° C. to 230° C.;
   the cylindrical core of the first filter element is shaped and dimensioned such that the first cylindrical core passes through and is meshed with the central through hole of the supporting plate, and the cylindrical core of the second filter element is shaped and dimensioned such that the second cylindrical core passes through and is meshed with the cylindrical core of the first filter element, and wherein the first cylindrical core has a diameter smaller than a diameter of the central through hole of the supporting plate; and
   the flanges of the first and second filter elements are shaped and sized such that they are received in respective circumferential grooves formed on both sides of the supporting plate.

9. The press filter as claimed in claim 8, wherein polytetrafluoroethylene (PTFE) membrane or an acrylic coating is applied to a surface of the non-woven needle-punch fabric.

10. A recessed type press filter, comprising a plurality of filter plates, each of the filter plates comprising a first filter element, a second filter element that is opposite to the first filter element, and a supporting plate that has a central through hole and a respective recessed area on both sides thereof, said supporting plate being sandwiched between the first and second filter elements; wherein each of the first and second filter elements is molded integrally from a non-woven needle-punch fabric to form a unitary structure, said non-woven needle-punch fabric having a gram weight ranging from 250 g/m$^2$ to 3000 g/m$^2$ which is self-sustaining and has shape maintenance, and is moldable; said non-woven needle-punch fabric is molded into a desired shape, and retains the desired shape under an external pressure after the non-woven needle-punch fabric is molded, such that each of the first and second filter elements molded from the non-woven needle-punch fabric maintains its shape without any support;

wherein said stand-alone non-woven needle-punch fabric is made of at least first and second fibers, the melting point of said first fiber being less than that of said second fiber, wherein the first fiber is rendered to become molten, wherein the nonwoven fabric consists of a single layer of fiber formed by evenly blending the first fiber and the second fiber, wherein said first fiber has a melting point ranging from 115° C. to 130° C., and said second fiber has a melting point ranging from 180° C. to 230° C.

11. The press filter as claimed in claim 10, wherein each of the first and second filter elements comprises a body, a recessed portion formed on the body and corresponding to the recessed area of the supporting plate, a cylindrical core formed at a center portion of the body; the recessed portion of the filter element being shaped and dimensioned to cooperate with the recessed area of the supporting plate, such that the first and second filter elements are respectively attached to the both sides of the supporting plate; and the body and the cylindrical core are molded integrally from the non-woven needle-punch fabric to form the unitary structure; and wherein the cylindrical core of the first filter element is shaped and dimensioned such that this cylindrical core passes through and is meshed with the central through hole of the supporting plate, and the cylindrical core of the second filter element is shaped and dimensioned such that this cylindrical core passes through and is meshed with the cylindrical core of the first filter element, and wherein the first cylindrical core has a diameter smaller than a diameter of the central through hole of the supporting plate.

12. The press filter as claimed in claim 11, wherein each of the first and second filter elements comprises four side flanges extending laterally from a circumferential edge of the filter element, wherein the cylindrical core and the four side flanges protrude outwardly from a same side of the body; and the four side flanges of each of the first and second filter elements are sized such that the first and second filter elements completely and exactly enclose the supporting plate; the body, the cylindrical core and the four side flanges are molded integrally from the non-woven needle-punch fabric to form a unitary structure.

13. The press filter as claimed in claim 12, wherein the supporting plate comprises two arms cantilevered from two opposite side surfaces of the supporting plate, and the side flanges of the first and second filter elements are formed with two respective notches which correspond to the two cantilevered arms such that the arms protrude beyond the first and second filter elements.

14. The press filter as claimed in claim 11, wherein each of the first and second filter elements comprises three side flanges extending laterally from three side edges of the filter element, wherein the cylindrical core and the three side flanges protrude outwardly from a same side of the body; and the three side flanges of each of the first and second filter elements are sized such that the first and second filter elements exactly enclose the supporting plate on top, left and right side surfaces thereof, with an open bottom side surface of the supporting plate; and the body, the cylindrical core and the three side flanges are molded integrally from the non-woven needle-punch fabric to form a unitary structure.

15. The press filter as claimed in claim 14, wherein the supporting plate comprises two arms cantilevered from two opposite side surfaces of the supporting plate, and side flanges of the first and second filter elements include two respective notches which correspond to the two cantilevered arms, resulting in the arms protruding beyond the first and second filter elements.

16. The press filter as claimed in claim 10, wherein a polytetrafluoroethylene (PTFE) membrane or an acrylic coating is applied to a surface of the non-woven needle-punch fabric.

* * * * *